No. 636,000. Patented Oct. 31, 1899.
L. HIRT.
APPARATUS FOR CONDENSING STEAM.
(Application filed June 17, 1899.)
(No Model.) 2 Sheets—Sheet 1.

Witnesses

Inventor
Ludwig Hirt
By Briesen & Knauth
his Attorneys

No. 636,000. Patented Oct. 31, 1899.
L. HIRT.
APPARATUS FOR CONDENSING STEAM.
(Application filed June 17, 1899.)
(No Model.) 2 Sheets—Sheet 2.
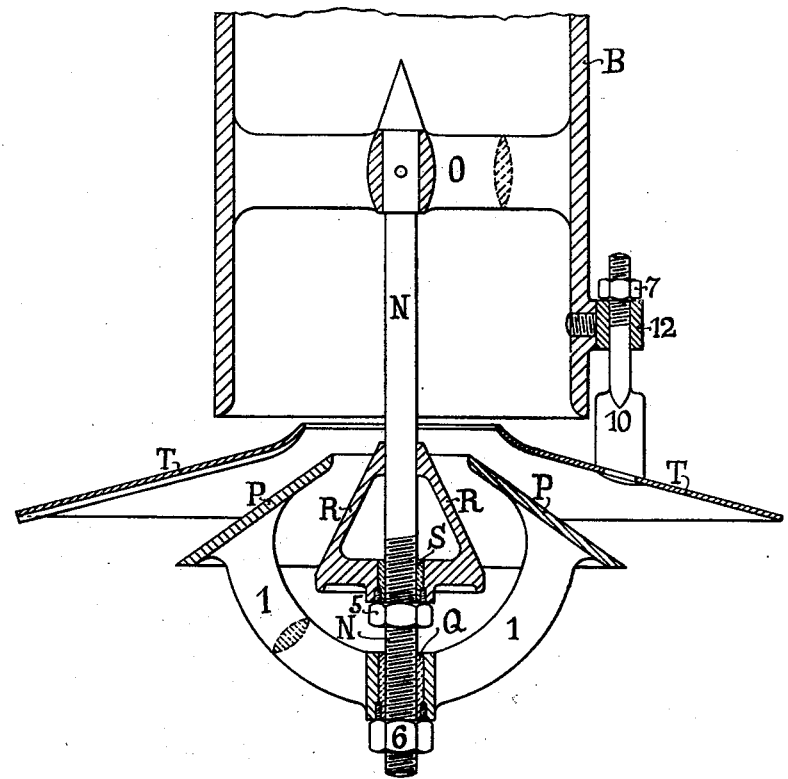
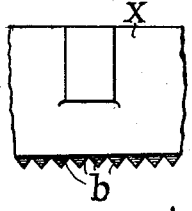
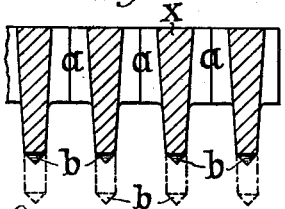
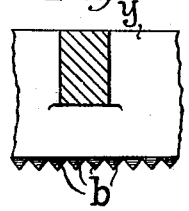
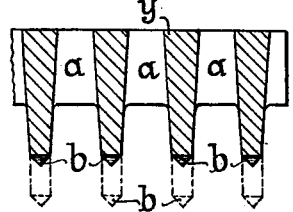
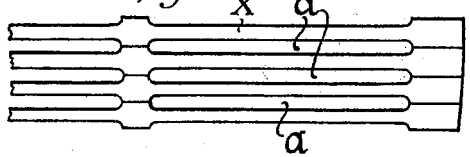
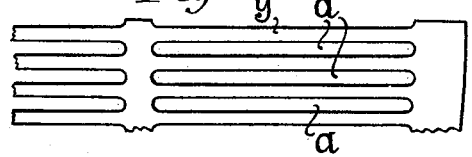

UNITED STATES PATENT OFFICE.

LUDWIG HIRT, OF GREVENBROICH, GERMANY, ASSIGNOR TO THE MASCHINENFABRIK GREVENBROICH, OF SAME PLACE.

APPARATUS FOR CONDENSING STEAM.

SPECIFICATION forming part of Letters Patent No. 636,000, dated October 31, 1899.

Application filed June 17, 1899. Serial No. 720,892. (No model.)

*To all whom it may concern:*

Be it known that I, LUDWIG HIRT, a subject of the King of Prussia, German Emperor, and a resident of Grevenbroich, in the Kingdom of Prussia, Empire of Germany, have invented new and useful Improvements in Apparatus for Condensing Steam, of which the following is a specification.

This invention refers to improvements in apparatus for the condensation of steam, and especially of exhaust-steam.

The main feature of the invention consists in devices for finely dividing the water which falls down upon the rising steam, and it more particularly refers to a combination of plates which direct the falling water and cause it to fall freely down in parabolic forms of bells in order to act upon the steam, and it furthermore refers to a combination of grates so arranged that the water falling by means of said plates down in parabolic forms is finely divided into thin films or drops of water to act upon the steam, while the moist surfaces of the grate or grates offer cooling or condensing surfaces to the steam in its course through the apparatus.

Figure 1:
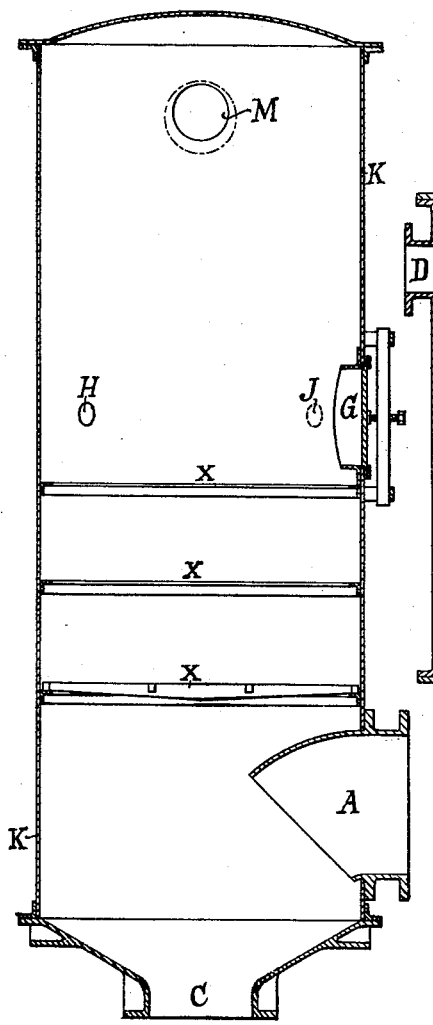
Figure 2:
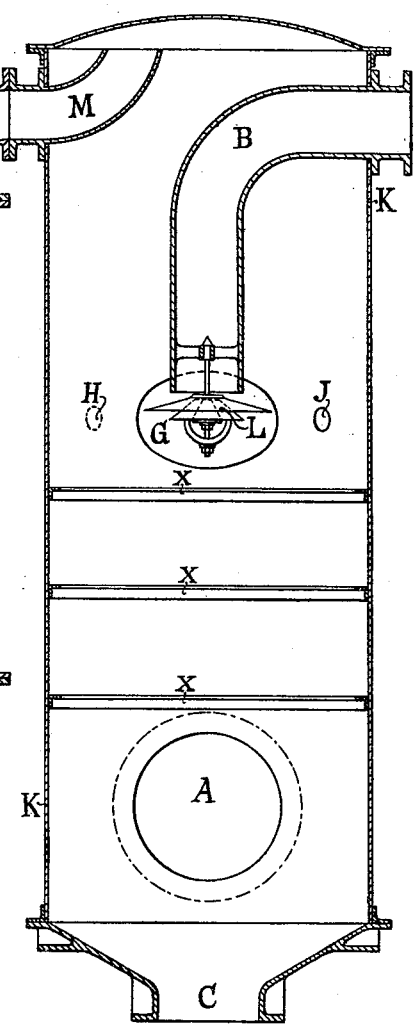

In the drawings, Figure 1 is a side view in longitudinal vertical axial section. Fig. 2 is a side view in longitudinal vertical axial section at right angles to Fig. 1. Fig. 3 is a detail of cones for distributing the water. Fig. 4 is a fragmentary detail side view of one form of gratings for distributing the water. Fig. 5 is a detail fragmentary transverse sectional view of the same. Fig. 6 is a fragmentary longitudinal sectional view of another form of grate. Fig. 7 is a transverse sectional view of the same. Fig. 8 is a plan view of the grate shown in Figs. 4 and 5. Fig. 9 is a plan view of the same.

Referring to the drawings, K is the main vessel, in which the condensation takes place; A, a pipe through which steam enters and rises in opposite direction to the falling condensing-water or cooling-water, which is first finely divided by the spray-cones into parabolic bell-like sheets and then into fine mist or spray by the crossed horizontal superimposed gratings $xxx$. The condensed steam, together with the now warmed cooling-water, flows through the outlet-nozzle C in the bottom of the vessel K, this nozzle and the attached outflow-pipes being in connection with the vacuum-pipe. The air and any still uncondensed gases or steam are drawn out by a dry-air pump through a pipe M, which has its inlet under the upper head of the vessel K. Such of these vapors as are condensable can be condensed in an after-condenser. This latter is connected with the dry-air pump by the nozzle D. The cooling-water for this second condenser or after-condenser enters at the nozzle F and after performing its office flows with the condensed steam or vapors through the discharge-nozzle E, which has suitable connection with a vacuum-pipe.

The main condenser is accessible in its interior by a manhole G, and the operations which go on therein can be observed through glazed peep-holes or sight-holes H and J.

The construction and operation of the distributing-plates or spray plates or cones for the cooling-water are as follows, in the accompanying illustrations three such plates or cones being shown, although more or fewer may be used. These distributers are attached to the central vertical cooling-water pipe, although they may be otherwise attached, if so desired. This central pipe has a bridge O, the arms of which are, for the purpose of offering minimum resistance to the water, lens-shaped in cross-section. For the same reason the middle of the bridge or spider, that is made into a central eye, is furnished with an upward-pointing conical tip. In this eye there is fastened the spindle N, that is threaded along its lower portion. On this spindle N there are the adjustable distributing cones or funnels P and R. The middle funnel-shaped plate P has a supporting-bow 1, of lens-shaped cross-section, that carries the sleeve Q, which latter has an interior thread. By means of this the plate P is screwed on the spindle N and can be vertically adjusted. The nut 6, which sits on the spindle N under the sleeve Q, serves as lock-nut as well as to fasten the plate P. The inner distributing-plate R, which has the form of a truncated cone, has a screwed sleeve S, which can be adjusted on the threaded part of the spindle N. The nut 5 serves as a lock-nut and also to make this plate R fast on the spindle.

The outer plate T is fastened by three screws 10, with flat heads, which screws are led through the eye 12 on the pipe B. By means of the nuts 7, which are on the screws 10 above the eye 12, this plate T can be vertically adjusted. Between or among the plates R P T, on the one hand, and between the plate T and the pipe B, on the other hand, are spaces the width of each of which can be varied by adjustment of the distributing-cones. The water which flows through B is, by means of the distribution-cones, diverted sidewise. It goes through the spaces between the plates and the pipe and is thereby sprayed or spread in fine films or sheets of parabolic bell form upon the entire surface of the underlying parts of the condenser vessel K. Adjustment of the plates regulates the proper distribution of the cooling-water over this surface. This distribution causes an intimate mixture of the cooling-water with the steam which is to be condensed, and thereby a rapid and thorough condensation. This action, however, is still further increased by the gratings or screens which lie under the distribution-plates. In the drawings three gratings are shown. There can, however, be more or fewer thereof. These gratings consist of single bars $x$ or of slit plates $y$, which lie upon the suitable supports attached to the walls of the vessel K. The separate bars, where such are used, are provided with lateral projections by which when put together they form slit-like orifices $a$. If plates are used, they are provided with slits. It must be remarked that the plates are so constructed as to produce exactly the same effect as where separate assembled bars are used. The cross-section of the bars tapers from above downward, and the under side is formed into inverted pyramidal or conical projections. The height of these grating-bars may be varied in the various parts of the apparatus with relation to the quantity of water which falls thereon. The bars of the several gratings can be so arranged that those of one grating lie at a certain desired angle to those of the upper grating—preferably each set lying at ninety degrees from the one above it, or so that under each opening $a$ there will be a bar-surface. The water which falls from the distributing-plates upon the gratings is very finely distributed by the gratings. It will trickle down the sides of the bars and drop from the points of the pyramidal or conical projections of the under sides of the bars upon the grating below, where a still finer division will take place. The great number of dripping-points on the under surface of the bars produce a fine rain of minute drops between the gratings and in the space under them all, which brings the incoming steam in contact with an enormous surface of cooling-water. Further, the slits $a$ effect a fine division of the steam itself and an intimate contact of the steam with moist surfaces. All this causes an exceptionally rapid and thorough cooling and condensing of the inflowing steam by the enormous cooling-water surface without calling for a great bulk of cooling-water.

I claim—

1. In a jet or cataract condenser, the combination of a water-supply pipe B, of an outer plate T adjustably attached by screws 10 to said pipe, a plate P and conical plate R, an immovable threaded spindle N to which said plates P and R are adjustably secured and means for securing the plates P and R in the adjusted position.

2. In a jet or cataract condenser, the combination of superposed horizontal gratings the bars of which have between or in them slits $a$ and which bars are downwardly inclined and terminate below in inverted pyramidal or conical projections from which the water drops, the superposed bars in each level being placed at an angle to those in the next levels above or below so that the bars of a lower grate are exactly under the slits of an upper grate.

3. In a jet or cataract condenser, the combination of a depending pipe carrying a plurality of distributing or spreading plates, said plates being spaced apart and adjustable with relation to one another and to the pipe which carries them and from which the falling water is diverted laterally in its course and compelled to fall in parabolic bell-like forms into the underlying condensing-space and superposed gratings the bars of which have between or in them slits $a$ and which bars are downwardly inclined and terminate below in inverted pyramidal or conical projections from which the water drops, the superposed gratings being situated under said spreading plates whereby the water which falls from the plates will be still further divided and distributed by the gratings.

In testimony that I claim the foregoing as my invention I have signed my name, in presence of two witnesses, this 16th day of May, 1899.

LUDWIG HIRT.

Witnesses:
CARL KNOOP,
HERNANDO DE SOTO.